United States Patent
Vaughn et al.

(10) Patent No.: US 12,418,799 B1
(45) Date of Patent: Sep. 16, 2025

(54) PORTABLE MEDIA GEOFENCE AND DEVICE PAIRING SECURITY

(71) Applicant: International Business Machines Corporation, Armonk, NY (US)

(72) Inventors: Kelly Vaughn, Hillsborough, NJ (US); Dane Warren, Highland, NY (US); Michael Kane, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 18/599,697

(22) Filed: Mar. 8, 2024

(51) Int. Cl.
  *H04W 12/64* (2021.01)
  *H04L 9/40* (2022.01)
  *H04W 12/47* (2021.01)
  *H04W 12/50* (2021.01)
  *H04W 12/30* (2021.01)

(52) U.S. Cl.
  CPC ........... *H04W 12/64* (2021.01); *H04L 63/107* (2013.01); *H04W 12/47* (2021.01); *H04W 12/50* (2021.01); *H04W 12/35* (2021.01)

(58) Field of Classification Search
  CPC ..... H04W 12/35; H04W 12/47; H04W 12/50; H04W 12/64; H04L 63/107
  See application file for complete search history.

(56) References Cited

U.S. PATENT DOCUMENTS

| | | | |
|---|---|---|---|
| 7,966,437 B1 | 6/2011 | Spoden | |
| 11,729,576 B2 | 8/2023 | Kerr | |
| 11,756,274 B1 | 9/2023 | Arya | |
| 2012/0011561 A1* | 1/2012 | Courtney | G06F 21/604 726/1 |
| 2014/0289875 A1* | 9/2014 | Knafel | G06F 21/6245 726/33 |

(Continued)

FOREIGN PATENT DOCUMENTS

| | | |
|---|---|---|
| CN | 1235227 C | 1/2006 |
| KR | 1020100056931 A | 5/2010 |

(Continued)

OTHER PUBLICATIONS

"Types of RFID Systems", IMPINJ, accessed on Dec. 4, 2023, 6 pages, <https://www.impinj.com/products/technology/how-can-rfid-systems-be-categorized>.

(Continued)

*Primary Examiner* — Robert B Leung
(74) *Attorney, Agent, or Firm* — Anthony Curro (57) ABSTRACT

A computer-implemented method and a computer program product for device pairing security. A computer scans a media device for a potential threat. In response to determining that the potential threat does not exist, a computer copies content of the media device to a secure media device. A computer configures a write protection mode on the secure media device. A computer configures a geofence policy, a low battery policy for the secure media device, and a security alert notification policy for the secure media device. A computer configures a policy of immediately wiping storage on the secure media device. A computer activates the secure media device for use on a host device in a secure facility. The secure media device includes an antenna of radio frequency identification, an antenna of a network, a microcontroller, and a battery.

20 Claims, 6 Drawing Sheets

(56) References Cited

U.S. PATENT DOCUMENTS

| | | | | |
|---|---|---|---|---|
| 2015/0304506 A1* | 10/2015 | Zhu | ............... | H04W 8/205 |
| | | | | 455/406 |
| 2015/0373030 A1* | 12/2015 | Bank | ............... | H04W 4/025 |
| | | | | 455/411 |
| 2016/0092685 A1* | 3/2016 | Tse | ............... | G06F 21/6218 |
| | | | | 726/1 |
| 2016/0150365 A1* | 5/2016 | Brown | ............... | H04W 12/033 |
| | | | | 455/410 |
| 2017/0353461 A1* | 12/2017 | Knapp | ............... | H04L 9/3247 |
| 2019/0197240 A1* | 6/2019 | Pradhan | ............... | G06F 21/568 |
| 2019/0261199 A1* | 8/2019 | Salkintzis | ............... | H04W 28/18 |
| 2020/0162895 A1* | 5/2020 | Chakra | ............... | H04L 63/107 |
| 2021/0350013 A1 | 11/2021 | Lakhani | | |
| 2021/0356279 A1 | 11/2021 | Szigeti | | |
| 2023/0083633 A1* | 3/2023 | Desai | ............... | G16H 10/60 |
| | | | | 726/19 |

FOREIGN PATENT DOCUMENTS

| | | |
|---|---|---|
| KR | 1020120046336 A | 5/2012 |
| KR | 101592591 B1 | 2/2016 |
| WO | 2006051052 A1 | 5/2006 |

OTHER PUBLICATIONS

"Ultra-Wideband (UWB) Devices", IMDA TS UWB, Issue 1, Oct. 1, 2016, © Copyright of IMDA, 2016, 13 pages.

"Ultra-Wideband RTLS, Positioning, & Sensor Technology", Inpixon, © 2023 Inpixon, 20 pages, <https://www.inpixon.com/technology/standards/ultra-wideband>.

Bhagyavati, "UWB and RFID: A Comparison and Contrast", Wireless Telecommunications Symposium 2005, © 2005 IEEE, 1 page.

Disclosed Anonymously, "Common Device Adaptor for different kind of tracking devices", IP.com No. IPCOM000258660D, IP.com Electronic Publication Date: Jun. 2, 2019, 5 pages.

Disclosed Anonymously, "Exploring the Unknown: A Dynamic, Drone-Based Vulnerability Scanner", IP.com No. IPCOM000263777D, IP.com Electronic Publication Date: Oct. 2, 2020, 8 pages.

Disclosed Anonymously, "Method and Framework for Cognitive Locking, Protection and Sharing of devices", IP. com No. IPCOM000249519D, IP.com Electronic Publication Date: Mar. 2, 2017, 7 pages.

Disclosed Anonymously, "Method and System for Cognitively Analysing and Scrubbing Geo-Tagged data for Protecting Privacy of Locations", IP.com No. IPCOM000258002D, IP.com Electronic Publication Date: Mar. 29, 2019, 4 pages.

Disclosed Anonymously, "Mobile Device Resource Conservation During Geolocation Operations" IP.com No. IPCOM000231493D, IP.com Electronic Publication Date: Oct. 2, 2013, 18 pages.

Kregar, Klemen, "Indoor UWB Positioning and Position Tracking Data Set", Scientific Data, 2023, 16 pages.

Liu et al., "Methods of Creating Local Relative Geofences for Ulta-Wide Band Enabled Devices", Technical Disclosure Commons, Defensive Publications Series, Jul. 2021, 8 pages.

\* cited by examiner

PORTABLE MEDIA GEOFENCE AND DEVICE PAIRING SECURITY

BACKGROUND

The present invention relates generally to data security, and more particularly to managing portable media devices in a secure facility where targeted security policies are enforced.

Increased frequency of high profile security breaches and new government standards for enhancing data security have driven actions for data center and cloud providers to prevent future breaches. New restrictions are put in place for portable media device. Service and recovery tasks can be impacted by polices limiting use of portable media or policies requiring destruction of portable media after their usage. Specific usage of portable media by a computer system includes delivery of backups, Activated Read Only Memories (AROMs), System Update Levels (SULs), customizable console data, load profiles, support login files, and other recovery related files.

SUMMARY

In one aspect, a computer-implemented method for device pairing security is provided. The computer-implemented method includes scanning a media device for a potential threat. The computer-implemented method further includes, in response to determining that the potential threat does not exist, copying content of the media device to a secure media device. The computer-implemented method further includes configuring a write protection mode on the secure media device. The computer-implemented method further includes configuring a geofence policy for the secure media device. The computer-implemented method further includes configuring a low battery policy for the secure media device. The computer-implemented method further includes configuring a security alert notification policy for the secure media device. The computer-implemented method further includes configuring a policy of immediately wiping storage on the secure media device. The computer-implemented method further includes activating the secure media device for use on a host device in a secure facility. In the computer-implemented method, the secure media device includes an antenna of radio frequency identification, an antenna of a network, a microcontroller, and a battery.

In another aspect, a computer program product for device pairing security is provided. The computer program product comprises a computer readable storage medium having program instructions embodied therewith, and the program instructions are executable by one or more processors. The program instructions are executable to: scan a media device for a potential threat; in response to determining that the potential threat does not exist, copy content of the media device to a secure media device; configure a write protection mode on the secure media device; configure a geofence policy for the secure media device; configure a low battery policy for the secure media device; configure a security alert notification policy for the secure media device; configure a policy of immediately wiping storage on the secure media device; and activate the secure media device for use on a host device in a secure facility. The secure media device includes an antenna of radio frequency identification, an antenna of a network, a microcontroller, and a battery.

DETAILED DESCRIPTION

Embodiments of the present invention provide a solution to safely allow removable media in high-security environments. A system and a method are proposed for managing portable media in a secure facility (such as a data center, a research facility, a manufacturing facility, a government facility, a medical facility, etc.) where targeted security policies are enforced. The system and the method provide location beaconing; therefore, remotely locatable and manageable media can be provisioned to manage specific security policies.

To enforce media security rules, the system and the method trigger secure erasure of portable media using radiofrequency (RF) or ultra-wideband (UWB) location fencing. The system and the method use radio frequency identification (RFID) pairing to manage device specific security policies. In the system and the method, a secure media device include a RFID reader, a UWB antenna, a microcontroller, and a battery to support secure erasure if the secure media device is disconnected from a host device in a secure facility, the secure media device is outside a geofence, or the battery of the secure media device is low.

Figure 1:
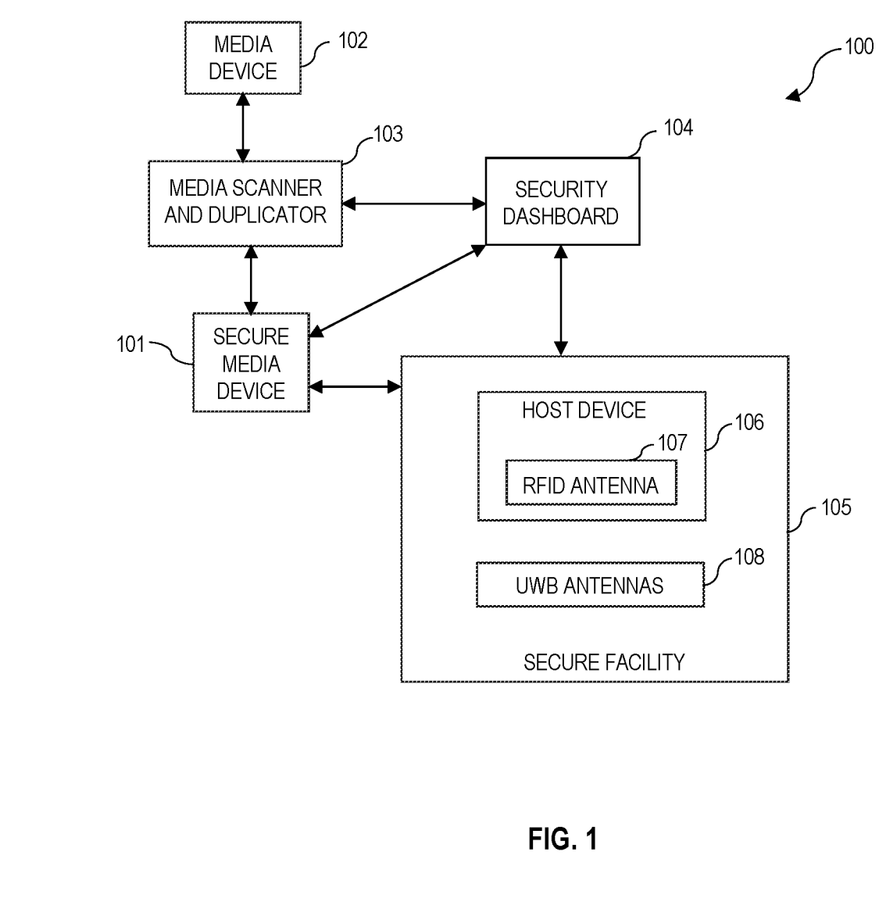
FIG. 1 is a diagram illustrating a system for portable media geofence and device pairing security, in accordance with one embodiment of the present invention.

FIG. 1 is a diagram illustrating system 100 for portable media geofence and device pairing security, in accordance with one embodiment of the present invention. System 100 includes secure media device 101 and media device 102. Secure media device 101 is a device for managing portable media in secure facility 105 where targeted security policies are enforced. For example, secure facility 105 may be a data center, a research facility, a manufacturing facility, a government facility, a medical facility, etc. The details of the components on secure media device 101 will be discussed in later paragraphs with reference to FIG. 2. Media device 102 is a device containing or storing content, such as a compact disc (CD), a digital video disc (DVD), or a floppy disc. Media device 102 may be a physical storage medium a non-volatile solid state storage device incorporated into secure media device 110.

Figure 6:
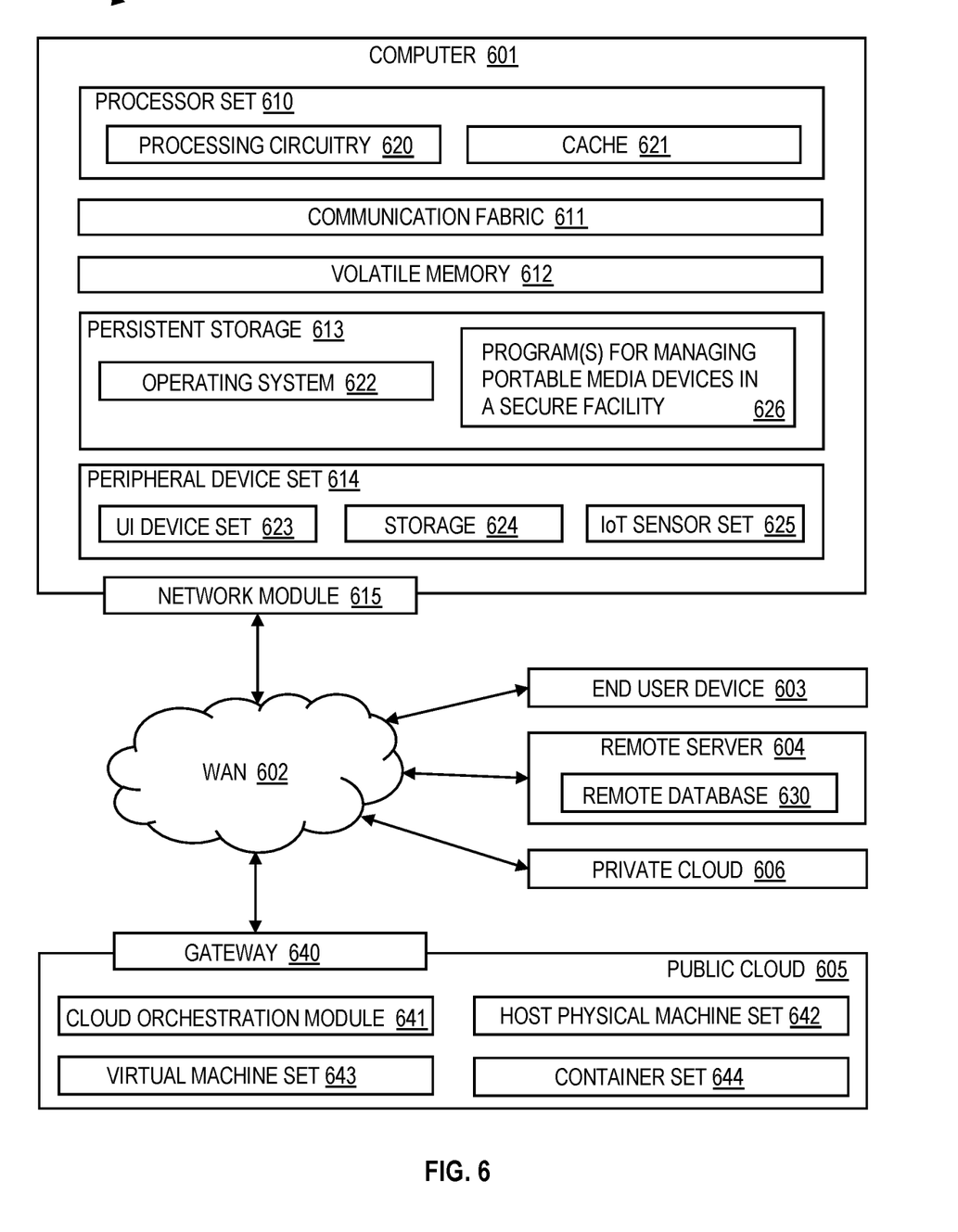
FIG. 6 is a systematic diagram illustrating an example of an environment for the execution of at least some of the computer code involved in performing portable media geofence and device pairing security, in accordance with one embodiment of the present invention.

System 100 further includes media scanner and duplicator 103. Media scanner and duplicator 103 is used to scan media from external sources on media device 102, copy data of the external sources on media device 102 to secure media device 101, and configure security polices for secure media device 101. Media scanner and duplicator 103 is implemented on a computer system or a server. The computer system or server may be any electronic device capable of receiving input from a user, executing computer program instructions, and communicating with another computing system or another server. Computer 601 shown in FIG. 6 is an example of the computer system or server.

System 100 further includes security dashboard 104. Security dashboard 104 is used to track the status of secure media device 101. The main purpose of security dashboard 104 is to provide a security team with necessary information about secure media device 101, including device status, locations, and alerts related to secure media device 101. Secure media device 101 can also be remotely wiped through security dashboard 104, if a security team deems it necessary. Security dashboard 104 is implemented on a computer system or a server. The computer system or server may be any electronic device capable of receiving input from a user, executing computer program instructions, and communicating with another computing system or another server. Computer 601 shown in FIG. 6 is an example of the computer system or server.

In system 100, host device 106 is located in secure facility 105. Host device 106 is a computer system or server (or any hardware) to which the managed media secure media device 101 is plugged. Host device 106 includes radio frequency identification (RFID) antenna 107. RFID antenna 107 is detected by RFID antenna 202 (shown in FIG. 2) on secure media device 101, and secure media device 101 determines whether the RFID of secure media device 101 matches the RFID of host device 106.

Figure 2:
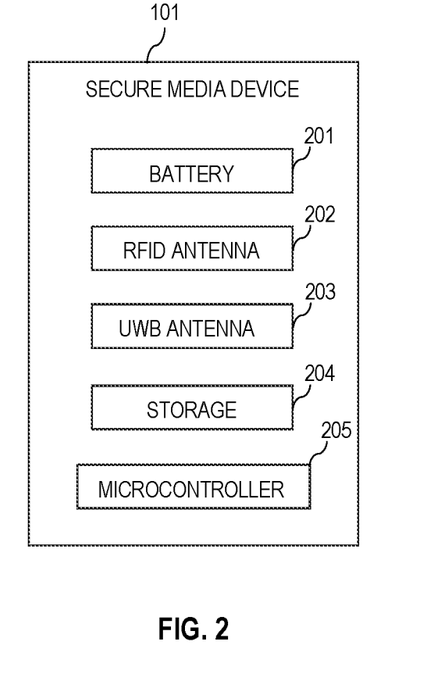
FIG. 2 is a diagram illustrating components of a secure media device in the system shown in FIG. 1, in accordance with one embodiment of the present invention.

In system 100, secure facility 105 has ultra-wideband (UWB) antennas 108 used for a UWB network. As shown in FIG. 2, secure media device 101 also has a UWB antenna used for the UWB network. In system 100, locations of secure media device 101 are tracked through the UWB network. Secure media device 101 and security dashboard 104 communicate through the UWB network; security alerts are transmitted from secure media device 101 to security dashboard 104 through the UWB network. The UWB network is used in the embodiment shown in FIG. 1. In other embodiments, other networks or protocols for the location tracking and the communications may be used.

FIG. 2 is a diagram illustrating components of secure media device 101 in system 100 shown in FIG. 1, in accordance with one embodiment of the present invention. Secure media device 101 includes battery 201, RFID antenna 202, UWB antenna 203, storage 204, and microcontroller 205. RFID antenna 202 detects RFID antenna 107 on host device 106 in secure facility 105, and microcontroller 205 on secure media device 101 determines whether RFID antenna 202 matches RFID antenna 107. UWB antenna 203 is used to communicate with security dashboard 104 and send security alerts to security dashboard 104. With UWB antenna 203, locations of secure media device 101 can be tracked through the UWB network. Storage 204 is a storage medium such as a flash drive. Microcontroller 205 wipes data in storage 204, upon determined security violations or in response to receiving a wiping request passed over the UWB network by a security team.

Figure 3:
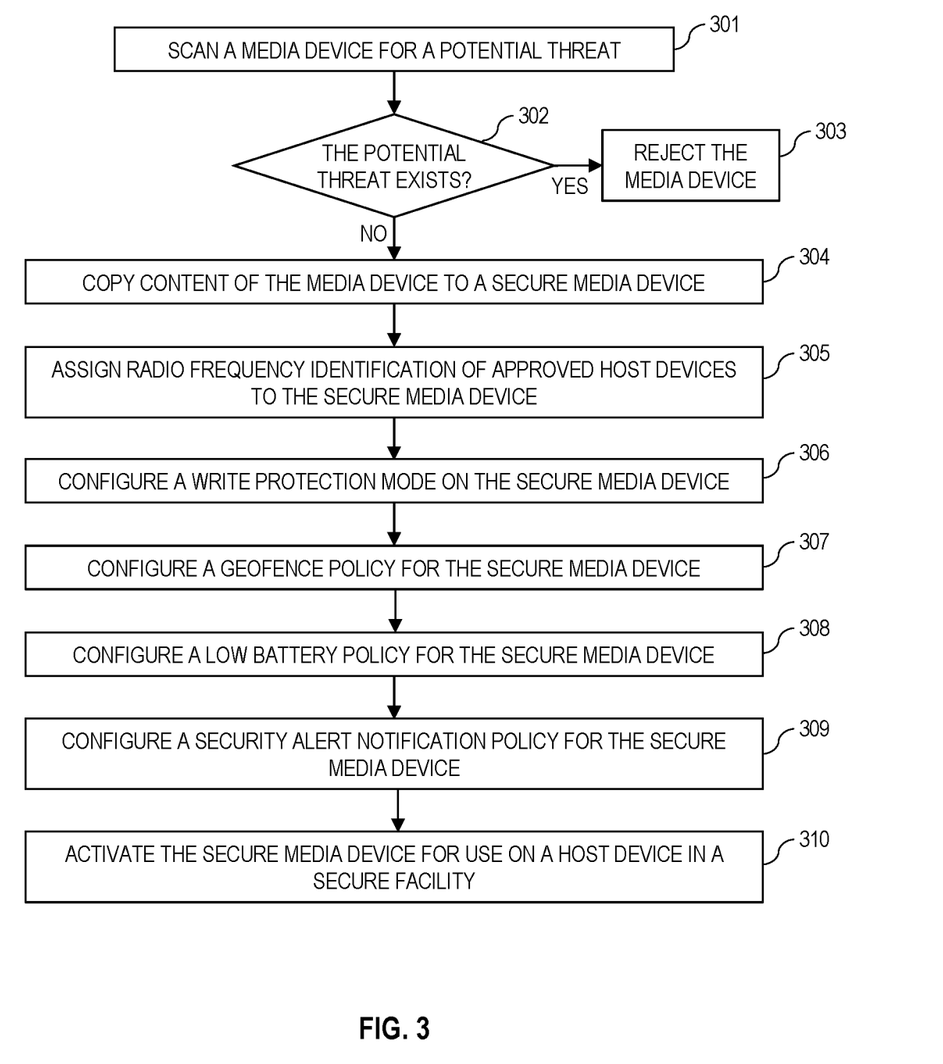
FIG. 3 is a flowchart showing operational steps of provisioning a secure media device, in accordance with one embodiment of the present invention.

FIG. 3 is a flowchart showing operational steps of provisioning a secure media device, in accordance with one embodiment of the present invention. The operational steps are executed by a computer system or server. The computer system or server may be any electronic device capable of receiving input from a user, executing computer program instructions, and communicating with another computing system or another server. Computer 601 shown in FIG. 6 is an example of the computer system or server.

In step 301, the computer system or server scans a media device for a potential threat. In step 302, the computer system or server determines whether the potential threat exists. In the embodiment shown in FIG. 1, media scanner and duplicator 103 (which is hosted by the computer system or server) scans media device 102 for a potential threat and determines whether the potential treat exists on media device 102.

In response to determining that the potential treat exists on the media device (YES branch of step 302), in step 303, the computer system or server rejects the media device. In response to determining that no potential treat exists on the media device (NO branch of step 302), in step 304, the computer system or server copies content of the media device to a secure media device. In the embodiment shown in FIG. 1, media scanner and duplicator 103 hosted by the computer system or server rejects media device 102, if the potential treat exists on media device 102; media scanner and duplicator 103 copies content of media device 102 to secure media device 101, if no potential treat exists on media device 102.

In step 305, the computer system or server assigns radio frequency identification (RFID) of approved host devices to the secure media device. The approved host devices can be used as hosts of the secure media device; in other words, the secure media device can be plugged in the approved host devices. In step 306, the computer system or server configures a write protection mode on the secure media device. In the embodiment shown in FIG. 1, host device 106 is an approved host device to which secure media device 101 can be plugged, and media scanner and duplicator 103 hosted by the computer system or server assigns RFID of host device 106 to secure media device 101. Media scanner and duplicator 103 configures a write protection mode on secure media device 101.

In step 307, the computer system or server configures a geofence policy for the secure media device. The geofence policy is applicable to the secure media device which limits it's position within a physical location. The geofence policy will be enforced using the secure media device's location determined through UWB location tacking. The geofence policy may be used to limit device use to a specific portion of a secure facility. For example, the secure facility may be a data center, research facility, a manufacturing facility, a government facility, a medical facility, etc. The secure media device is disabled and a violation of the geofence policy, if the secure media device is removed from the geofence. In the embodiment shown in FIG. 1, media scanner and duplicator 103 hosted by the computer system or server configures a geofence policy for secure media device 101.

In step 308, the computer system or server configures a low battery policy for the secure media device. The low battery policy allows the secure media device to perform an erase procedure in an event that the voltage reading of the battery of the secure media device drops below a specified level. The low battery policy ensures that no data is left on the secure media device in an event that the battery dies; the event prevents the secure media device from being tracked and prevents security policies from being enforced. In the embodiment shown in FIG. 1, media scanner and duplicator 103 configures a low battery policy for secure media device 101.

In step 309, the computer system or serve configures a security alert notification policy for the secure media device.

The security alert notification policy allows the secure media device to communicate a security alert to the computer system or serve in an event that a defined security policy violation occurs, such as an event when the secure media device is taken outside it's geofence or an event when the secure media device is plugged to an unauthorized host device. In the embodiment shown in FIG. 1, media scanner and duplicator 103 configures a security alert notification policy for secure media device 101 so that secure media device 101 is allowed to communicate a security alert to security dashboard 104.

In step 310, the computer system or serve activates the secure media device for use on the host device in a secure facility (e.g., a data center, a research facility, a manufacturing facility, a government facility, a medical facility, etc.). The computer system or serve uses the secure media device to bring in external media and to be used in the secure facility. In the embodiment shown in FIG. 1, media scanner and duplicator 103 activates secure media device 101 for use on host device 106 in secure facility 105.

Figure 4:
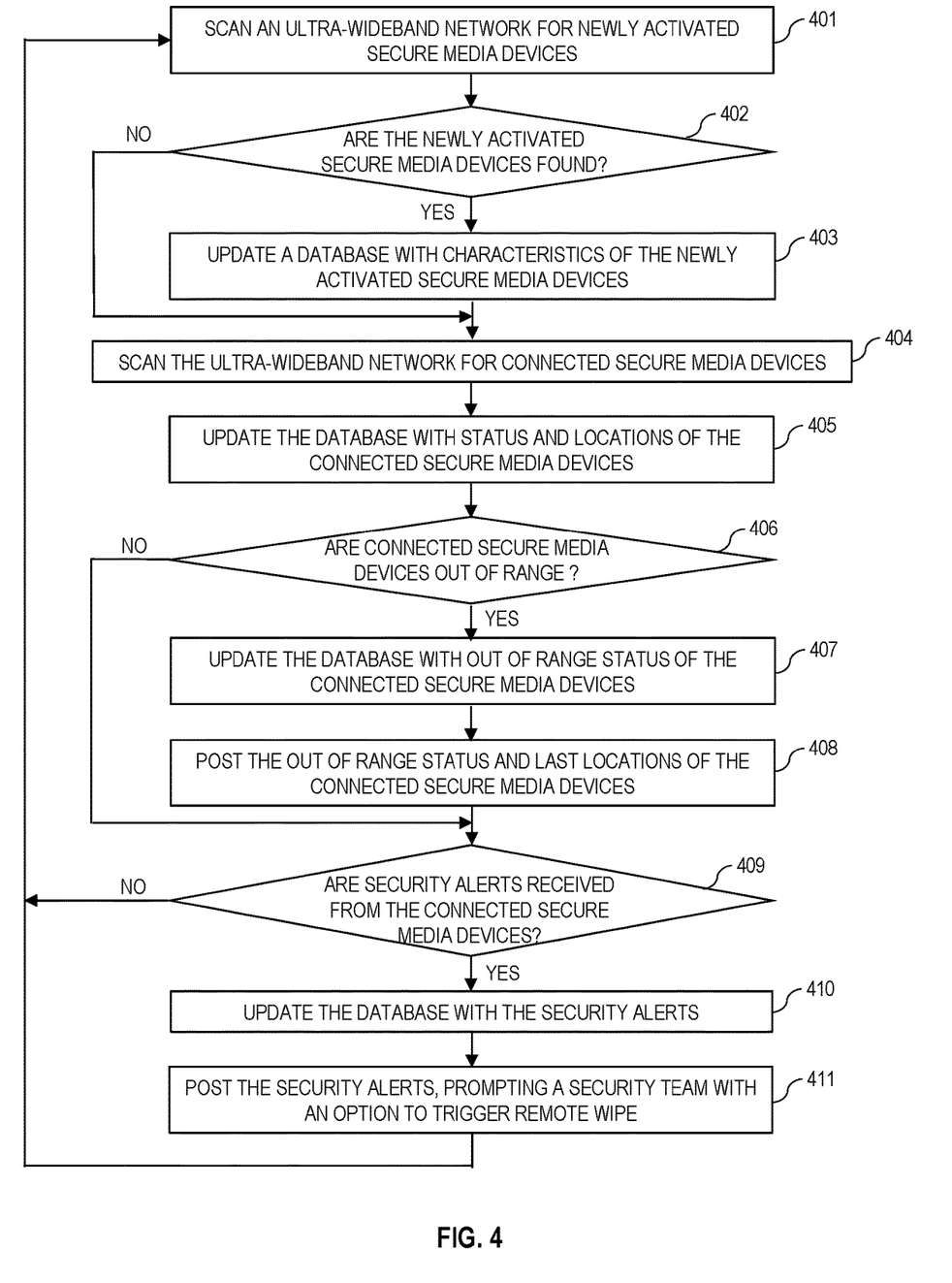
FIG. 4 is a flowchart showing operational steps of monitoring a security status of a secure media device, in accordance with one embodiment of the present invention.

FIG. 4 is a flowchart showing operational steps of monitoring a security status of a secure media device, in accordance with one embodiment of the present invention. The operational steps are executed by a computer system or server. The computer system or server may be any electronic device capable of receiving input from a user, executing computer program instructions, and communicating with another computing system or another server. Computer 601 shown in FIG. 6 is an example of the computer system or server.

In step 401, the computer system or server scans an ultra-wideband (UWB) network for newly activated secure media devices. The purpose of scanning UWB network is to find the newly activated secure media devices and therefore the newly activated secure media devices can be monitored. In the embodiment shown in FIG. 1, security dashboard 104 hosted by the computer system or server scans the UWB network which is established by UWB antennas 108 in secure facility 105.

In step 402, the computer system or server determines whether the newly activated secure media devices are found. In response to determining that the newly activated secure media devices are found (YES branch of step 402), in step 403, the computer system or server updates a database with characteristics of the newly activated secure media devices. In the embodiment shown in FIG. 1, security dashboard 104 hosted by the computer system or server updates the database with the characteristics of the newly activated secure media devices (such as secure media device 101 if it is just activated).

In response to determining that the newly activated secure media devices are not found (NO branch of step 402) or after step 403, in step 404, the computer system or server scans the UWB network for connected secure media devices (or registered secure media devices). Through scanning, the computer system or server finds the connected secure media devices and therefore the connected secure media devices can be monitored. In the embodiment shown in FIG. 1, security dashboard 104 hosted by the computer system or server scans the UWB network (which is established by UWB antennas 108 in secure facility 105) to find the connected secure media devices (such as secure media device 101 if it has been connected).

In step 405, the computer system or server updates the database with statuses and locations of the connected secure media devices. The statuses and locations of the connected secure media devices can be determined through the UWB network. In the embodiment shown in FIG. 1, security dashboard 104 hosted by the computer system or server updates the database with statuses and locations of the connected secure media devices such as secure media device 101.

In step 406, the computer system or server determines whether the connected secure media devices are out of range or outside a geofence. In this step, the computer system or server determines whether one or more of the connected secure media devices are out of range or outside the geofence. In response to determining that the one or more of the connected secure media devices are out of range or outside the geofence (YES branch of step 406), in step 407, the computer system or server updates the database with out of range status (or status of outside the geofence) of the one or more of the connected secure media devices. The out of range status (or status of outside the geofence) of the one or more of the connected secure media devices can be determined through the UWB network. In the embodiment shown in FIG. 1, security dashboard 104 hosted by the computer system or server determines whether the one or more of the connected secure media devices are out of range or outside the geofence.

In step 408, the computer system or server posts the out of range status (or status of outside the geofence) and last locations of the one or more of the connected secure media devices. In the embodiment shown in FIG. 1, security dashboard 104 hosted by the computer system or server posts the out of range status (or status of outside the geofence) and the last locations.

In response to determining that the one or more of the connected secure media devices are not out of range (NO branch of step 406) or after step 408, in step 409, the computer system or server determines whether security alerts are received from the connected secure media devices. A connected secure media device generates an alert in an event when the connected secure media device detects a policy violation; for example, the policy may include a geofence policy or a low battery policy configured for the secure media device. In the embodiment shown in FIG. 1, security alerts are transmitted from secure media device 101 to security dashboard 104 (which is hosted by the computer system or server) through the UWB network; in the embodiment shown in FIG. 2, UWB antenna 203 on secure media device 101 is used to send the security alerts to security dashboard 104.

In response to determining that security alerts are received from the connected secure media devices (YES branch of step 409), in step 410, the computer system or server updates the database with the security alerts. In step 411, the computer system or server posts the security alerts, prompting a security team with an option to trigger remote wipe. In the embodiment shown in FIG. 1, security dashboard 104 (which is hosted by the computer system or server) updates the database with the security alerts and posts the security alerts.

In response to determining that security alerts are not received from the connected secure media devices (NO branch of step 409) or after step 411, the computer system or server reiterates step 401 to keep scanning the UWB network.

Figure 5:
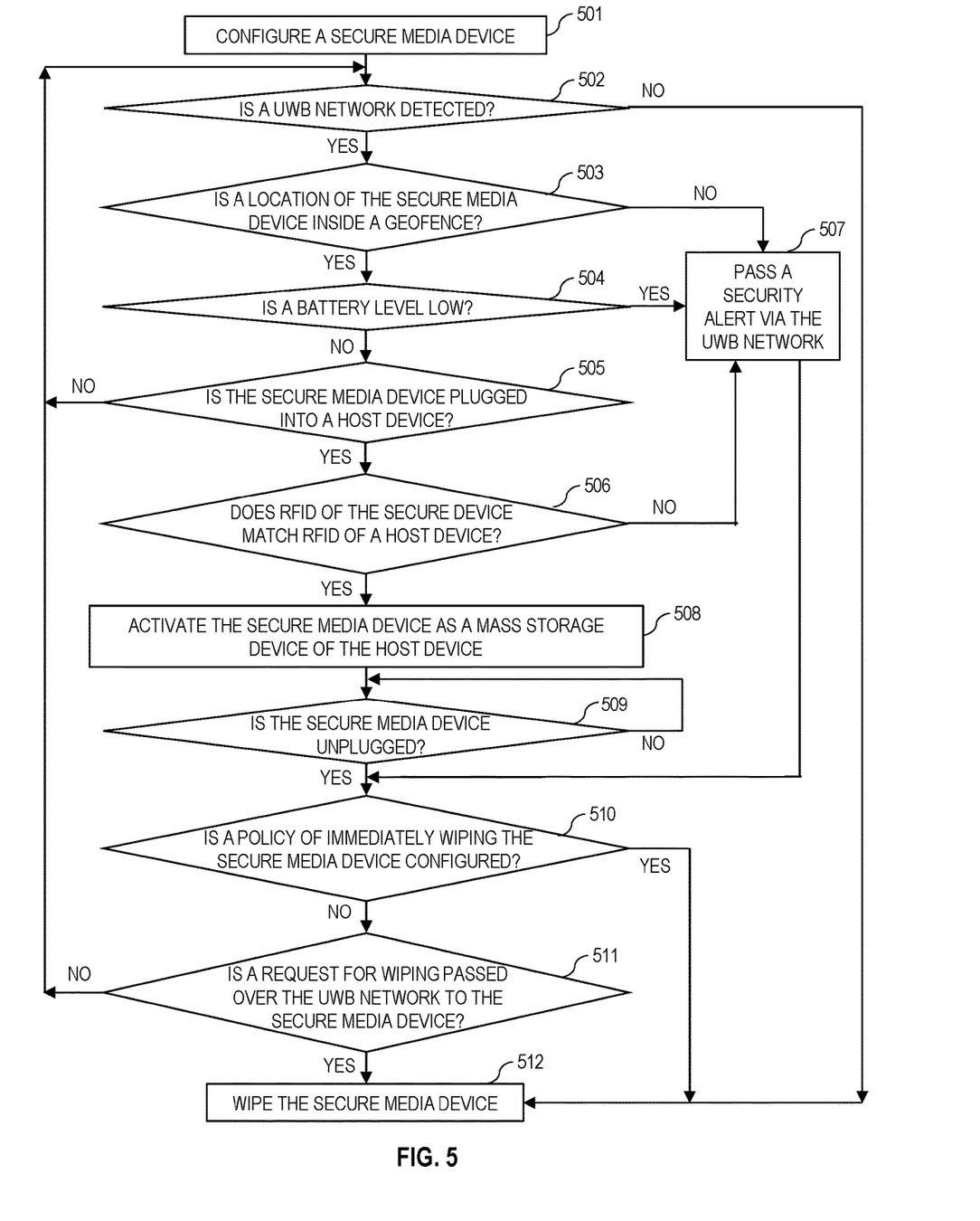
FIG. 5 is a flowchart showing operational steps of managing a security status of a secure media device, in accordance with one embodiment of the present invention.

FIG. 5 is a flowchart showing operational steps of managing a security status of a secure media device, in accordance with one embodiment of the present invention. The operational steps are executed by components on the secure media device. FIG. 2 shows an example of the components such as a microcontroller, a radio frequency identification (RFID) antenna, and an ultra-wideband (UWB) antenna.

In step 501, the secure media device are configured. The operational steps of configuration of the secure media device are described in FIG. 3. Through the operational steps shown in FIG. 3, the secure media device is configured and activated for use on a host device in a secure facility. For example the secure facility may be a data center, a research facility, a manufacturing facility, a government facility, a medical facility, etc. With the configured secure media device, the following operational steps are executed.

In step 502, the secure media device determines whether a UWB network is detected. In an example shown in FIG. 1 and FIG. 2, UWB antenna 203 on secure media device 101 captures UWB network signals emitted by UWB antennas 108 in secure facility 105; based on whether UWB antenna 203 captures the UWB network signals, microcontroller 205 on secure media device 101 determines whether a UWB network is detected.

In response to determining that the UWB network is detected (YES branch of step 502), in step 503, the secure media device determines whether a location of the secure media device is inside a geofence. A geofence policy for the secure media device has been configured (as described in operational steps shown in FIG. 3). The geofence policy limits the secure media device within a physical location of a secure facility. In an example shown in FIG. 1 and FIG. 2, microcontroller 205 on secure media device 101 determines whether secure media device 101 is inside a geofence of secure facility 105.

In response to determining that the location of the secure media device is inside the geofence (YES branch of step 503), in step 504, the secure media device determines whether a battery level on the secure media device is low. In an example shown in FIG. 1 and FIG. 2, microcontroller 205 on secure media device 101 determines whether battery 201 on secure media device 101 is low.

In response to determining that the battery level on the secure media device is not low (NO branch of step 504), in step 505, the secure media device determines whether the secure media device is plugged into a host device. In an example shown in FIG. 1 and FIG. 2, microcontroller 205 on secure media device 101 determines whether secure media device 101 is plugged in host device 106 in secure facility 105.

In response to determining that the secure media device is plugged into a host device (YES branch of step 505), in step 506, the secure media device determines whether radio frequency identification (RFID) of the secure device matches radio frequency identification (RFID) of the host device. In an example shown in FIG. 1 and FIG. 2, microcontroller 205 on secure media device 101 determines whether the RFID of secure media device 101 matches the RFID of host device 106 in secure facility 105.

In response to determining that the location of the secure media device is not inside the geofence (NO branch of step 503), or in response to determining that the battery level on the secure media device is low (YES branch of step 504), or in response to determining that the RFID of the secure device does not match the RFID of the host device (NO branch of step 506), in step 507, the secure media device passes a security alert via the UWB network. In an example shown in FIG. 1 and FIG. 2, microcontroller 205 on secure media device 101 passes the security alert via the UWB network to security dashboard 104.

In response to determining that the RFID of the secure device matches the RFID of the host device (YES branch of step 506), in step 508, the secure media device activates the secure media device as a mass storage device of the host device. In an example shown in FIG. 1 and FIG. 2, microcontroller 205 on secure media device 101 activates secure media device 101 as a mass storage device of host device 105.

In step 509, the secure media device determines whether the secure media device is unplugged from the host device. In response to determining that the secure media device is not unplugged from the host device (NO branch of step 509), the secure media device reiterates step 509 to keep monitoring whether the secure media device is unplugged. In an example shown in FIG. 1 and FIG. 2, microcontroller 205 on secure media device 101 determines whether secure media device 101 is unplugged from host device 105.

In response to determining that the secure media device is unplugged from the host device (YES branch of step 509) or after step 507, in step 510, the secure media device determines whether a policy of immediately wiping storage on the secure media device is configured. In an example shown in FIG. 1 and FIG. 2, microcontroller 205 on secure media device 101 determines whether a policy of immediately wiping storage 204 on secure media device 101 is configured; the policy of immediately wiping secure media device 101 may be configured by media scanner and duplicator 103.

In response to determining that the policy of immediately wiping the storage on the secure media device is not configured (NO branch of step 510), in step 511, the secure media device determines whether a request for wiping the storage on the secure media device is passed over the UWB network to the secure media device. In an example shown in FIG. 1 and FIG. 2, microcontroller 205 on secure media device 101 determines whether the request is passed over the UWB network.

In response to determining that the policy of immediately wiping the storage on the secure media device is configured (YES branch of step 510), or in response to determining that the request for wiping the storage on the secure media device is passed over the UWB network to the secure media device (YES branch of step 511), or in response to determining that the UWB network is not detected (NO branch of step 502), in step 512, the secure media device wipes the storage on the secure media device. In an example shown in FIG. 1 and FIG. 2, microcontroller 205 on secure media device 101 erases content stored in storage 204 on secure media device 101.

In response to determining that the secure media device is not plugged into a host device (NO branch of step 505) or in response to determining that the request for wiping the storage on the secure media device is not passed over the UWB network to the secure media device (NO branch of step 511), the secure media device reiterates step 502.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

In FIG. 6, computing environment 600 contains an example of an environment for the execution of at least some of the computer code involved in performing the inventive methods, such as program(s) 626 for portable media geofence and device pairing security. In addition to block 626, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 626, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

Computer 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

Processor set 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located off chip. In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 626 in persistent storage 613.

Communication fabric 611 is the signal conduction path that allows the various components of computer 601 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

Persistent storage 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in block 626 typically includes at least some of the computer code involved in performing the inventive methods.

Peripheral device set 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

Network module 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

Remote server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as images. A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

What is claimed is:

1. A computer-implemented method for device pairing security, the computer-implemented method comprising:
    scanning a media device for a potential threat;
    in response to determining that the potential threat does not exist, copying content of the media device to a secure media device;
    configuring a write protection mode on the secure media device;
    configuring a geofence policy for the secure media device;
    configuring a low battery policy for the secure media device;
    configuring a security alert notification policy for the secure media device;
    configuring a policy of immediately wiping storage on the secure media device;
    activating the secure media device for use on a host device in a secure facility; and
    wherein the secure media device includes an antenna of radio frequency identification, an antenna of a network, a microcontroller, and a battery.

2. The computer-implemented method of claim 1, further comprising:
    assigning the radio frequency identification of the host device to the secure media device.

3. The computer-implemented method of claim 1, further comprising:
    scanning the network for the secure media device; and
    updating a status and a location of the secure media device.

4. The computer-implemented method of claim 1, further comprising:
    scanning the network for the secure media device;
    in response to determining that the secure media device is outside a geofence, updating a database with a status of outside the geofence of the secure media device; and
    posting the status of outside the geofence and a last location of the secure media device.

5. The computer-implemented method of claim 4, further comprising:
    in response to receiving a security alert from the secure media device, updating the database with the security alert; and
    posting the security alert and prompting a security team to trigger remote wipe of storage on the secure media device.

6. The computer-implemented method of claim 1, further comprising:
    in response to determining that the secure media device is not inside a geofence, the radio frequency identification of the secure media device does not match the radio frequency identification of the host device, or the battery is low, passing, by the microcontroller, a security alert from the secure media device to a secure dashboard via the network; and
    in response to determining that the policy of immediately wiping the storage on the secure media device is configured, wiping, by the microcontroller, the storage on the secure media device.

7. The computer-implemented method of claim 1, further comprising:
    in response to determining that the secure media device is inside a geofence, the radio frequency identification of the secure media device matches the radio frequency identification of the host device, and the battery is not low, activating, by the microcontroller, the secure media device as a mass storage device of the host device.

8. The computer-implemented method of claim 1, further comprising:
    in response to the secure media device being unplugged from the host device and the policy of immediately wiping the storage on the secure media device being configured, wiping, by the microcontroller, the storage on the secure media device.

9. The computer-implemented method of claim 1, further comprising:
    in response to receiving a request for wiping storage on the secure media device, wiping, by the microcontroller, the storage on the secure media device; and
    wherein the request is passed through the network from a security team to the secure media device.

10. The computer-implemented method of claim 1, further comprising:
    in response to determining that the network is not detected, wiping, by the microcontroller, storage on the secure media device.

11. A computer program product for device pairing security, the computer program product comprising a computer readable storage medium having program instructions stored therewith, the program instructions executable by one or more processors, the program instructions executable to:
    scan a media device for a potential threat;
    in response to determining that the potential threat does not exist, copy content of the media device to a secure media device;
    configure a write protection mode on the secure media device;
    configure a geofence policy for the secure media device;
    configure a low battery policy for the secure media device;
    configure a security alert notification policy for the secure media device;
    configure a policy of immediately wiping storage on the secure media device;
    activate the secure media device for use on a host device in a secure facility; and
    wherein the secure media device includes an antenna of radio frequency identification, an antenna of a network, a microcontroller, and a battery.

12. The computer program product of claim 11, further comprising the program instructions executable to:
assign the radio frequency identification of the host device to the secure media device.

13. The computer program product of claim 11, further comprising the program instructions executable to:
scan the network for the secure media device; and
update a status and a location of the secure media device.

14. The computer program product of claim 11, further comprising the program instructions executable to:
scan the network for the secure media device;
in response to determining that the secure media device is outside a geofence, update a database with a status of outside the geofence of the secure media device; and
post the status of outside the geofence and a last location of the secure media device.

15. The computer program product of claim 14, further comprising the program instructions executable to:
in response to receiving a security alert from the secure media device, update the database with the security alert; and
post the security alert and prompt a security team to trigger remote wipe of storage on the secure media device.

16. The computer program product of claim 11, further comprising the program instructions executable to:
in response to determining that the secure media device is not inside a geofence, the radio frequency identification of the secure media device does not match the radio frequency identification of the host device, or the battery is low, pass, by the microcontroller, a security alert from the secure media device to a secure dashboard via the network; and
in response to determining that the policy of immediately wiping the storage on the secure media device is configured, wipe, by the microcontroller, the storage on the secure media device.

17. The computer program product of claim 11, further comprising the program instructions executable to:
in response to determining that the secure media device is inside a geofence, the radio frequency identification of the secure media device matches the radio frequency identification of the host device, and the battery is not low, activate, by the microcontroller, the secure media device as a mass storage device of the host device.

18. The computer program product of claim 11, further comprising the program instructions executable to:
in response to the secure media device being unplugged from the host device and the policy of immediately wiping the storage on the secure media device being configured, wipe, by the microcontroller, the storage on the secure media device.

19. The computer program product of claim 11, further comprising the program instructions executable to:
in response to receiving a request for wiping storage on the secure media device, wipe, by the microcontroller, the storage on the secure media device; and
wherein the request is passed through the network from a security team to the secure media device.

20. The computer program product of claim 11, further comprising the program instructions executable to:
in response to determining that the network is not detected, wipe, by the microcontroller, storage on the secure media device.

* * * * *